US011866161B1

(12) United States Patent
Pope

(10) Patent No.: US 11,866,161 B1
(45) Date of Patent: Jan. 9, 2024

(54) HELICOPTER WITH COAXIAL COUNTER-ROTATING ROLLER DRIVEN ROTORS

(71) Applicant: Charles Douglas Pope, Middleburg, FL (US)

(72) Inventor: Charles Douglas Pope, Middleburg, FL (US)

( * ) Notice: Subject to any disclaimer, the term of this patent is extended or adjusted under 35 U.S.C. 154(b) by 148 days.

(21) Appl. No.: 17/657,948

(22) Filed: Apr. 4, 2022

Related U.S. Application Data

(63) Continuation-in-part of application No. 17/644,755, filed on Dec. 16, 2021, now Pat. No. 11,292,588.

(51) Int. Cl.
| | |
|---|---|
| *B64C 27/72* | (2006.01) |
| *B64C 27/10* | (2023.01) |
| *B64D 27/24* | (2006.01) |
| *B64C 27/605* | (2006.01) |
| *B64C 27/12* | (2006.01) |
| *B64C 27/64* | (2006.01) |

(52) U.S. Cl.
CPC .............. *B64C 27/72* (2013.01); *B64C 27/10* (2013.01); *B64C 27/12* (2013.01); *B64C 27/605* (2013.01); *B64D 27/24* (2013.01); *B64C 27/64* (2013.01); *B64C 2027/7216* (2013.01)

(58) Field of Classification Search
CPC ......... B64C 27/72; B64C 27/10; B64C 27/12; B64C 27/605; B64C 27/64; B64C 2027/7216; B64D 27/24
See application file for complete search history.

(56) References Cited

U.S. PATENT DOCUMENTS

| 9,896,196 | B1* | 2/2018 | Kaiser ................. B64C 29/0025 |
| 2005/0067527 | A1* | 3/2005 | Petersen ................ B64C 27/10 244/17.11 |
| 2016/0152338 | A1* | 6/2016 | Schlunke ............... B60V 1/046 244/23 R |

\* cited by examiner

*Primary Examiner* — Valentina Xavier
(74) *Attorney, Agent, or Firm* — Mark Young PA

(57) ABSTRACT

A helicopter includes annular rotors surrounding a fuselage. Rotor blades extend radially outwardly from each annular rotor. One or more motors is provided. Each motor rotates a roller, which drives each annular rotor by traction. In an embodiment with two rotors, one rotor rotates in one direction and the other rotor rotates in the opposite direction. A swash device with a grooved outer cylindrical surface engages the free end of a crank arm of each rotor blade to provide collective and cyclic pitch control. Actuators, which may be electromechanical or hydraulic, control positioning and movement of the swash device. Batteries, an electric generator and/or a hydrogen fuel cell may supply electric power.

20 Claims, 16 Drawing Sheets

HELICOPTER WITH COAXIAL COUNTER-ROTATING ROLLER DRIVEN ROTORS

RELATED APPLICATIONS

This application is a continuation in part and claims the benefit of priority of U.S. application Ser. No. 17/644,755, filed Dec. 16, 2021, the entire contents of which are incorporated herein.

FIELD OF THE INVENTION

This invention relates generally to aircraft, and, particularly, to a helicopter with coaxial counter-rotating roller-driven rotors.

BACKGROUND

Conventional helicopters include elaborate and heavy engine and transmission systems to provide power to drive a rotor and anti-torque system and to transmit torque from an output shaft of the engine to main and tail rotor assemblies. Unfortunately, both the engine and transmission are heavy, bulky and inefficient due to frictional losses. The engine and transmission are also expensive and difficult to maintain.

Another shortcoming of conventional helicopters is instability. A tail rotor assembly or other comparable anti-torque system is required to stabilize the helicopter.

Another shortcoming of conventional helicopters is excessive drag. The conventional design of a bulbous fuselage below a rotor is far from sleek.

What is needed is an efficient helicopter that avoids conventional engines, transmissions and tail rotor assemblies, while providing a reduced drag configuration that achieves equivalent or superior performance to a conventional helicopter.

The invention is directed to overcoming one or more of the problems and solving one or more of the needs as set forth above.

SUMMARY OF THE INVENTION

To solve one or more of the problems set forth above, in an exemplary implementation of the invention, a helicopter with coaxial counter-rotating roller-driven rotors is provided. In one embodiment, the helicopter includes at least one electric motor but preferably a plurality of electric motors (e.g., 2, 3 or 4) evenly spaced around a fuselage. Each electric motor includes an output shaft that drives a roller. Rotor blades extend radially outwardly from a pair of aligned, parallel, spaced-apart annular rotors. Each rotor is a ring-shaped structure, configured to rotate about the fuselage. The rollers are positioned between the annular rotors. The rotors are concentric, aligned and have the same diameters. Each roller is positioned and sized to simultaneously frictionally engage and drive each rotor, with each rotor being driven in a direction that is opposite from the direction of the other rotor. The top of a roller frictionally engages the underside of an upper rotor, while the bottom of the rotor frictionally engages the topside of the lower rotor. Motion of the roller is imparted to the rotors through traction. One rotor rotates in one direction and the other rotor rotates in the opposite direction. A swash device, for each rotor, with a grooved outer cylindrical surface engages the free end of a crank arm of each rotor blade to provide collective and cyclic pitch control. Actuators, which may be electromechanical or hydraulic, control positioning and movement of the swash device. Batteries, an electric generator and/or a hydrogen fuel cell may supply electric power.

The pitch of each blade may be adjusted collectively and cyclically using a swash device, such as a swash ring, and actuators (e.g., linear actuators such as hydraulic servos). A swash ring disposed between the fuselage and each rotor has a grooved outer periphery. Rotor blades extend radially outward from each rotor. Each blade has an airfoil cross-section shape and generates aerodynamic lift when rotated with the rotor. Each blade is pivotally coupled by a crank arm to an annular rotor. Rotation of the annular rotor causes the blades attached to the rotor to move in a circular path that is concentric with the annular rotor. Such movement through air causes the blades to produce lift. The crank arm allows pivoting adjustment of the pitch of each blade. The crank arm includes a free end that may be engaged for pivoting adjustment of the pitch of each blade. The free end is engaged by the groove of the swash ring. The swash ring is capable of linear motion along a first axis perpendicular to the swash ring plane, pitch motion about a second axis parallel to the swash ring plane and perpendicular to the first axis, roll motion about a third axis parallel to the swash ring plane and perpendicular to the first axis and perpendicular to the second axis, and combinations of linear, pitch and roll motions. Linear, pitching and rolling movement of the swash ring, as caused by the actuators, causes the crank arm of a blade to pivot. Pivoting of a crank arm engaged in the groove of the swash ring adjusts the pitch of the blade to which the crank arm is coupled. Such linear, pitch and roll motions affect the free end of each crank arm engaged in the groove, and thereby cause an attendant change in the pitch of each blade. Pitching of the blade can change the direction and magnitude of the net lift vector. A collective control actuates the actuators (e.g., hydraulic servos) to affect linear motion of the swash ring. A cyclic control actuates actuators (e.g., hydraulic servos) to affect pitch and roll motion of the swash ring.

In lieu of hydraulic actuators, electromechanical actuators may be used. Such actuators may be controlled from inputs to an electronic control unit operably coupled to the actuators.

In one embodiment, an electric helicopter according to principles of the invention includes a fuselage. A pair of aligned, parallel, spaced-apart annular rotors are provided. At least a portion of the fuselage is disposed in an open center of the annular rotors. A first annular rotor rotates in a first direction relative to the fuselage. A second annular rotor rotates in a second direction relative to the fuselage. The second direction is opposite the first direction. A plurality of rotor blades extend radially outwardly from the each annular rotor. Each rotor blade is coupled to an annular rotor with a pivot coupling. The pitch of each rotor blade is adjustable at the pivot coupling. An electric motor drives a wheel. The wheel, which is disposed between the aligned, parallel, spaced-apart annular rotors, frictionally engages both annular rotors, simultaneously. Through traction, rotation of the wheel drives the first annular rotor in the first direction and the second annular rotor in the second direction.

In another embodiment, a plurality of electric motors, each having a shaft and driving a wheel, are provided. The wheel driven by each such motor is disposed between the aligned, parallel, spaced-apart annular rotors, frictionally engages both annular rotors, simultaneously. Through traction, rotation of the wheel drives the first annular rotor in the first direction and the second annular rotor in the second direction. The plurality of electric motors may be evenly spaced. For example, two motors may be spaced 180° apart, three motors may be spaced 120° apart, and four motors may be spaced 90° apart.

Each annular rotor is a ring-shaped structure with a surface facing each drive wheel. Each annular rotor may optionally include an annular pad. The annular pad may be disposed between each drive wheel and the side of the annular rotor facing the drive wheel. The annular pad is attached to the side of the annular rotor facing the drive wheel. The annular pad provides a high coefficient of friction for increased traction between the drive wheel and the annular rotor. When worn or damaged, the annular pad may be replaced.

A first swash device (e.g., swash ring) has a cylindrical outer periphery with a groove extending in a circular path around the cylindrical outer periphery. The cylindrical outer periphery has an outer diameter that is less than an inner diameter of the first annular electric motor. The first swash device is aligned with the first annular rotor. The first swash device is movable to control collective and cyclical pitch of the rotor blades.

A second swash device (e.g., swash ring) has a cylindrical outer periphery with a groove extending in a circular path around the cylindrical outer periphery. The cylindrical outer periphery has an outer diameter that is less than an inner diameter of the second annular electric motor. The second swash device is aligned with the second annular rotor. The second swash device is movable to control collective and cyclical pitch of the rotor blades.

A plurality of first linear actuators are operably coupled to the first swash device to control movement of the first swash device to control collective and cyclical pitch of the rotor blades. In one embodiment, a linkage couples the first swash device to the second swash device, wherein movement of the first swash device causes the same (equal) movement of the second swash device. In another embodiment, a plurality of second linear actuators are operably coupled to the second swash device to control movement of the second swash device to control collective and cyclical pitch of the rotor blades. The plurality of second linear actuators may produce equal collective and cyclical pitch movement of the second swash device as the plurality of first linear actuators produce collective and cyclical pitch movement of the first swash device. In one embodiment, the first plurality of first linear actuators is aligned with the second plurality of second linear actuators to constitute a pair of aligned actuators, and each actuator in a pair of aligned actuators undergoing (imparting) equal movement. Each linear actuator may be a hydraulic actuator or an electromechanical actuator.

For pitch control, a crank arm may extend from a root side of each rotor blade. Pivoting adjustment of each crank arm causes pitching motion of the rotor blade from which each crank arm extends. Each crank arm includes a free end engageable for pivoting adjustment of the pitch of each blade. The free end of each crank arm extending into the groove of one of the first swash device and the second swash device.

An electric power supply may comprise at least one battery (e.g., a bank of batteries). The electric power supply may further comprise at least one electric generator. Alternatively, the electric power supply may comprise at least one hydrogen fuel cell.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
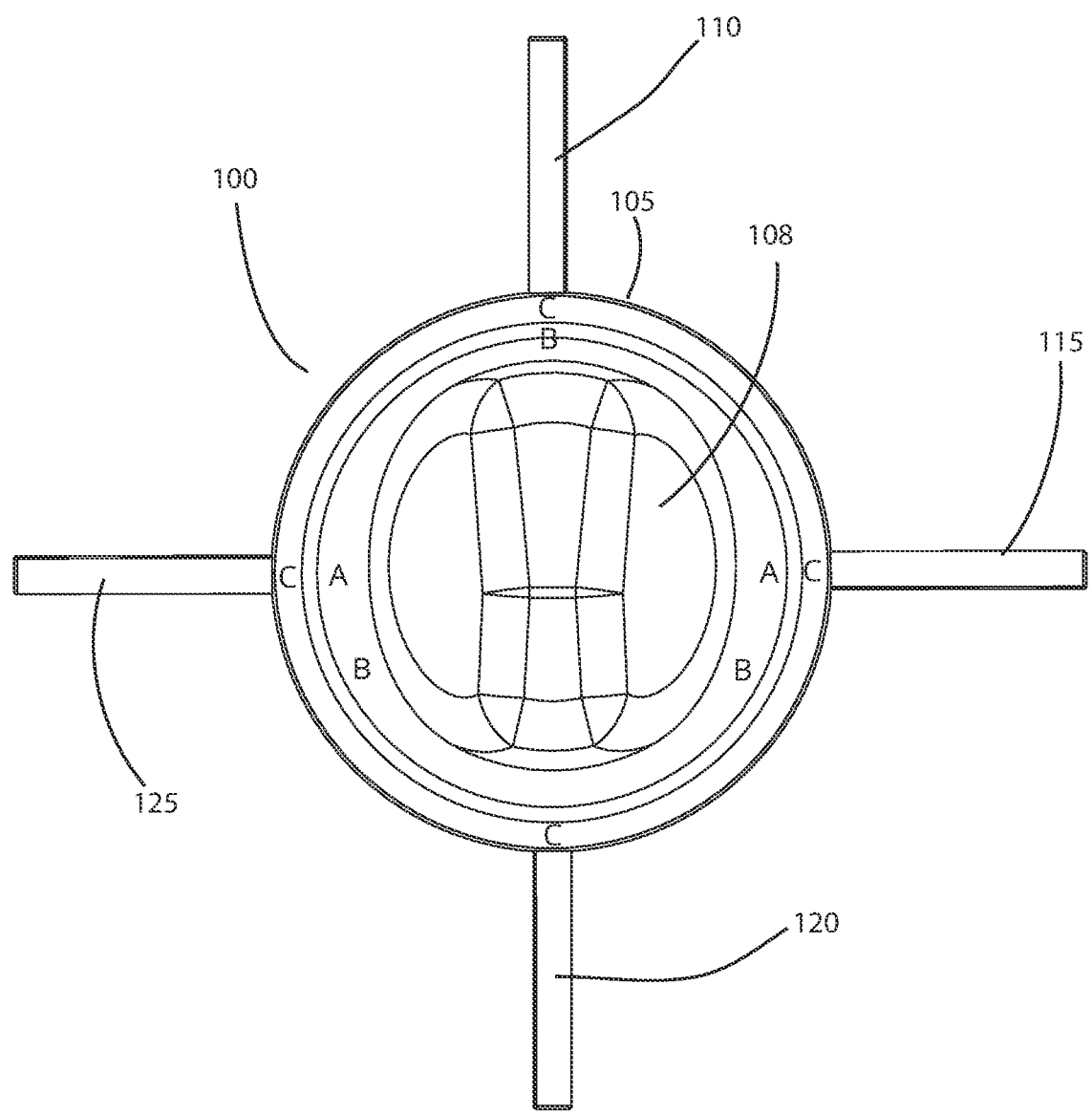
FIG. 1 is a plan view of an exemplary helicopter with coaxial counter-rotating roller-driven rotors according to principles of the invention.
Figure 2:
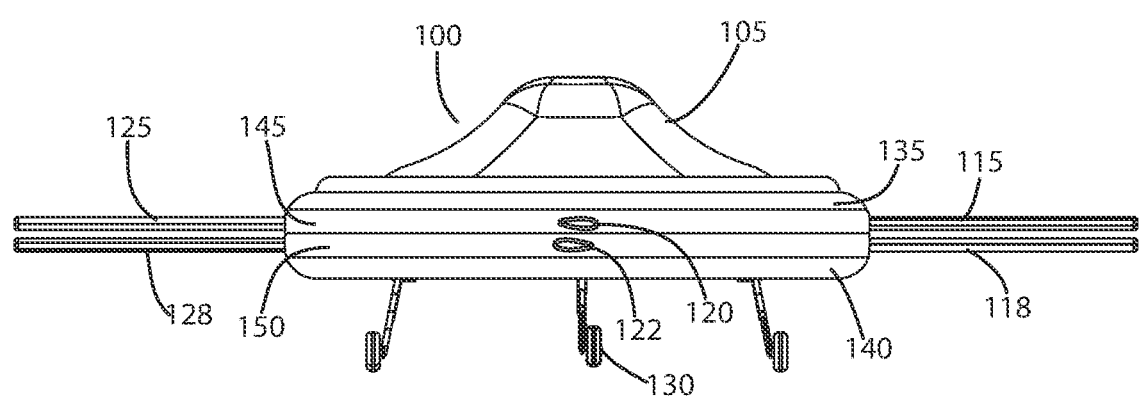
FIG. 2 is a front view of an exemplary helicopter with coaxial counter-rotating roller-driven rotors according to principles of the invention.
Figure 3:
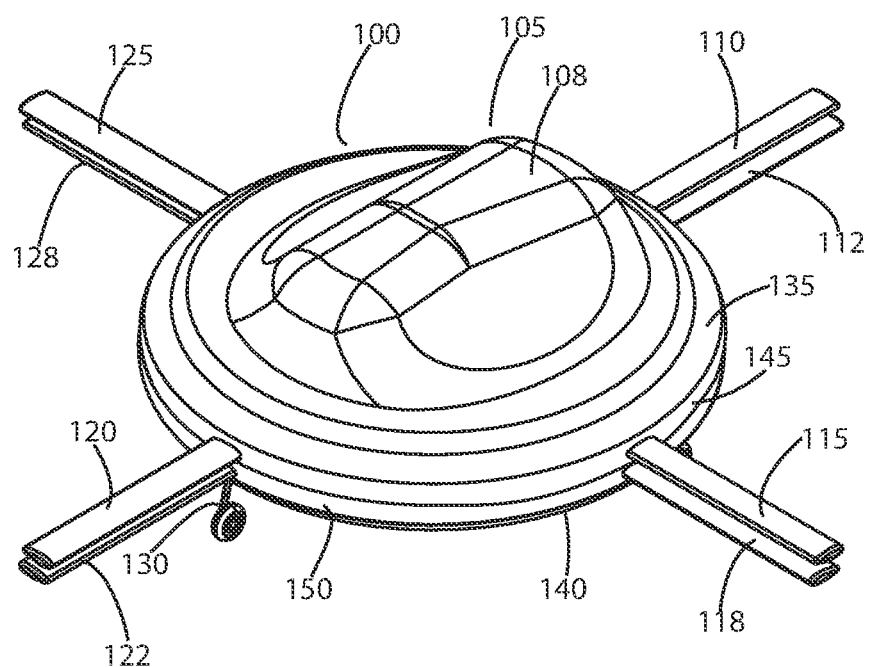
FIG. 3 is a perspective view of an exemplary helicopter with coaxial counter-rotating roller-driven rotors according to principles of the invention.
Figure 4:
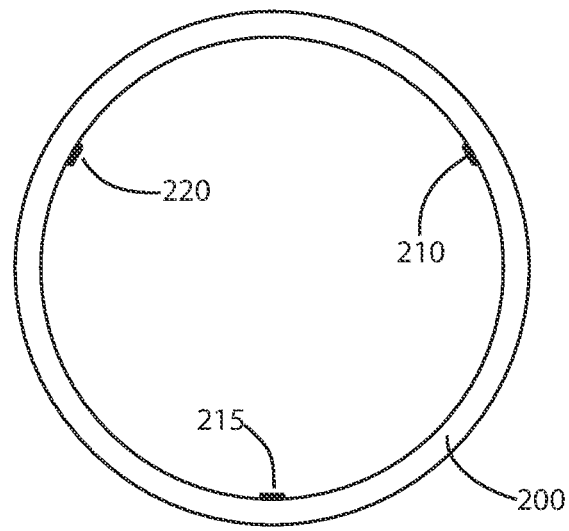
FIG. 4 is a plan view of an exemplary swash ring for a helicopter with coaxial counter-rotating roller-driven rotors according to principles of the invention.
Figure 5:
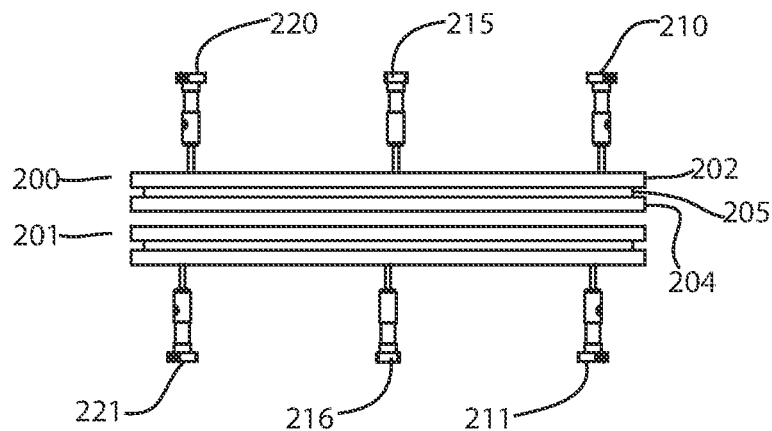
FIG. 5 is a side view of an exemplary pair of swash rings for a helicopter with coaxial counter-rotating roller-driven rotors according to principles of the invention.
Figure 6:
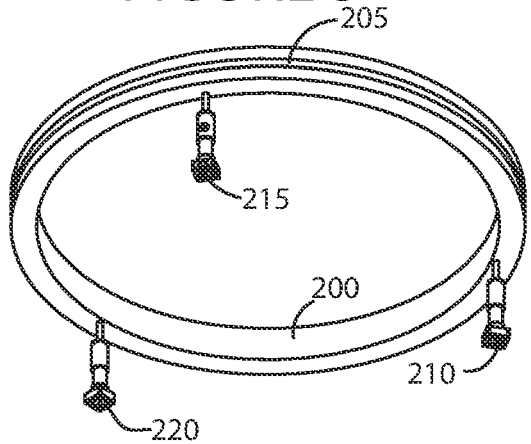
FIG. 6 is a perspective view of an exemplary swash ring for a helicopter with coaxial counter-rotating roller-driven rotors according to principles of the invention.

FIGS. 1-3 conceptually illustrate a helicopter 100 with coaxial counter-rotating roller-driven rotors 145, 150 according to principles of the invention. A plurality of rotor blades 110, 115, 120 and 125 extend radially from an upper rotor 145. Likewise, a plurality of rotor blades 112, 118, 122 and 128 extend radially from a lower rotor 150. While four blades extend radially from each rotor, the invention is not limited to rotors with 4 blades. Each rotor may have two or more blades. The larger the helicopter, the greater its weight and the more lift will be needed to achieve flight. By using more blades, lift can be increased.

The plan view of FIG. 1 is annotated to illustrate motor positions. A helicopter according to principles of the invention includes a pair of concentric, aligned, spaced-apart parallel ring-like annular rotors, to which the blades 112, 118, 122 and 128 are attached. The rotors are driven in opposite directions of rotation. The mechanism for driving the rotors is at least one motor driven roller. The shaft of the motor rotates about an axis that is perpendicular to the axis of rotation of the rotors. A roller, such as a nitrogen inflated tire, is attached to the shaft of the motor and disposed between the rotors. Rotation of the motor shaft cause rotation of the roller. The roller frictionally engages the underside of the upper rotor and the topside of the lower rotor. Rotation of the roller urges the rotors to rotate in opposite directions, one rotor rotating counterclockwise while the other rotor rotates clockwise. These features are discussed in greater detail below.

In an embodiment with one motor, the motor may be located at any clock position relative to the fuselage 105. In an embodiment with two motors, the motors may be located 180° apart, such as, by way of example and not limitation, at the A-A clock positions. In an embodiment with three motors, the motors may be located 120° apart, such as, by way of example and not limitation, at the B-B-B clock positions. In an embodiment with four motors, the motors may be located 90° apart, such as, by way of example and not limitation, at the C-C-C-C clock positions. In each case with a plurality of motors, the motors are evenly spaced apart. A plurality of motors provides redundancy, enabling operation even if one motor fails.

A fuselage 105, a body section that may hold crew in a cockpit and passengers or cargo in a connected compartment, or in an unmanned aircraft may contain equipment, may be covered by a canopy 108. In a manned aircraft, the canopy 108, a substantially transparent enclosure over the cockpit, shields the cockpit contents and, if a manned aircraft, the crew, from ambient conditions, including wind, elements and noise. The canopy 108 may be any aerodynamic shape that is suitable for providing a protective cover. By way of example and not limitation, the canopy may be vacuum formed acrylic.

Landing gear 130 supports the helicopter 100 above ground and facilitates transportation. The illustrated landing gear has a "taildragger" or tricycle tailwheel configuration, with two wheels and supports towards the front of the aircraft and another wheel at the rear. However, the invention is not limited to any landing gear, landing gear with wheels, arrangement of wheels, or number of wheels.

The exemplary helicopter 100 includes a pair of annular rotors 145, 150 with a plurality of rotor blades 110, 115, 120, 125 and 112, 118, 122, 128 extending radially from the high-level rotors 145, 150. The rotors 145, 150 may rotate at a determined speed (e.g., an optimum RPM) to produce the maximum amount of lift for the least amount of power. The longer the span or length of a blade, the faster the blade tip will travel. The tip speed of a rotor blade also increases as the helicopter itself goes faster. This is because the air meeting the rotor blade on the advancing side of the helicopter has its own forward aircraft speed plus the rotational speed or the rotor blade itself. The speed of sound at sea level is around 761 mph, and at 10,000 feet is about 734 mph. Depending upon altitude, as the tip of the advancing rotor blade reaches this speed, it may begin to break the sound barrier and create shockwaves. Such shockwaves disturb the airflow and create huge amounts of drag. When this happens the blade tip goes from producing lift to creating drag. This reduction in lift not only reduces the lifting power of the rotor blade but also increases sound and vibration—two further unwanted aspects of a helicopter. To overcome this problem, the span (length) of the blade may be reduced, the rotor may rotate slower, the helicopter's top speed may be reduced, the rotor blade tip may be configured to reduce the shock wave.

For a rotor blade to work as efficiently as possible it needs undisturbed air passing over it. Disturbed, and irregular airflow over the blade will reduce the lift it produces. As each rotor blade passes through the air it creates turbulence that it leaves behind in its wake. A helicopter with many rotor blades may not allow the air to get a chance to be replaced with smooth, undisturbed air before the next blade reaches it. To help overcome this problem, in one embodiment, rotor blades extending from a rotor may be positioned in different planes. For example, a rotor with four blades may have two opposite blades attached at or near the top of the rotor, and two opposite blades attached at or near the bottom of the rotor. Thus, one blade rotates on a higher plane, the next blade on a lower plane, the next on the higher plane, then next on the lower plane, and so on. This helps provide more undisturbed air for each blade.

The fuselage 105, a body section that holds crew in a cockpit and passengers or cargo in a connected compartment, is covered by a canopy 108. The canopy 108, a substantially transparent enclosure over the cockpit, shields the crew from ambient conditions, including wind, the elements and noise. The canopy 108 may be any aerodynamic shape that is suitable for providing a protective cover. By way of example and not limitation, the canopy may be vacuum formed acrylic.

In an embodiment with lift generating blades, the helicopter includes at least two rotor blades. In the exemplary embodiment, four blades 110, 115, 120, 125 and 112, 118, 122, 128 are shown. The rotating blades generate both the aerodynamic lift force that supports the weight of the helicopter and a thrust vector which exceeds aerodynamic drag in directional flight. The blades 110, 115, 120, 125 and 112, 118, 122, 128 are airfoils with a high aspect ratio, a shape which minimizes drag from tip vortices. The rotor blades 110, 115, 120, 125 and 112, 118, 122, 128 may be made out of various materials, including aluminum, steel or titanium, or composites, with or without abrasion shields along the leading edge. Any suitable airfoil shape may be used, though a subsonic, generally symmetric airfoil is shown. Additionally, the airfoil shape may vary from root to tip or remain uniform as shown in the Figures.

The rotor blades 110, 115, 120, 125 and 112, 118, 122, 128 are attached to the rotating annular rotors 145, 150. The attachment allows pivoting of the blades 110, 115, 120, 125 and 112, 118, 122, 128 to change pitch of the blades relative to the rotating annular rotors 145, 150. The pitch of each blade 110, 115, 120, 125 and 112, 118, 122, 128 may be adjusted collectively and cyclically using a swash ring and hydraulic linear actuators that interact with a pitch change link 170 in FIGS. 4-7. By changing pitch, the lift vectors are varied. Lift vectoring is an ability of the aircraft to manipulate the direction of the net aerodynamic force from its blades in order to control attitude, velocity and acceleration.

Figure 7:
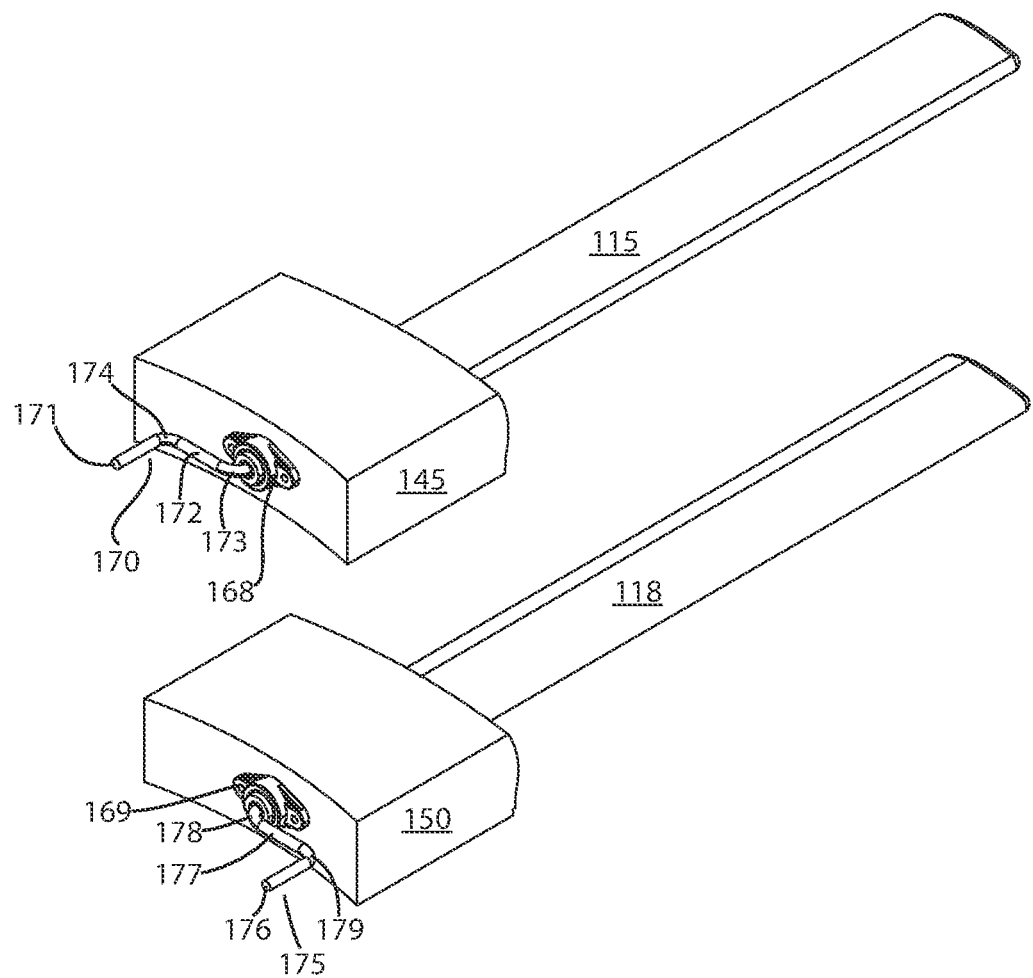
FIG. 7 is a perspective view of an exemplary rotor section for a helicopter with coaxial counter-rotating roller-driven rotors according to principles of the invention.

A crank arm, known as a pitch change link 170, 172 for each rotor blade, such as blades 115, 118, extends through each annular rotor 145, 150 and through one or more bearings 168, 169. The free end of each pitch change link 170, 172 extends into a groove of a swash ring 200, 201. A plurality of linear actuators, e.g., including actuators 210, 211, provide collective and cyclical pitch control. The swash rings 200, 201 do not rotate. The pitch change link 170, 175, extends from the root of each blade, through its corresponding rotor 145, 150, as shown in FIG. 7. The free end 171, 176 of the pitch change link 170, 175 (i.e., arm) mates with (i.e., is received in) and slides in a groove in a swash ring 200. Pivoting of the arm 170, 175 imparts torque to the rotor blade 115, 118. The arm 170, 175 pivots independent of the rotor 145, 150. Pivoting of the arm 170, 175 causes equal pivoting of the rotor blade 115, 118 relative to the rotor 145, 150. The arm 170, 175 connects to the blade 115, 118 at the point about which the blade pivots for pitching motion. This point is typically the center of lift along the chord of the airfoil. For many airfoils, this is at about the quarter chord of the airfoil at the root.

The arm 170, 175 is long enough to extend through a section of the rotor 145, 150, as illustrated in FIG. 7. In the exemplary embodiment, the arm 170, 175 extends through the annular rotor 145, 150 and through one or more bearings 168, 169. While one bearing 168, 169 is shown on one side of the rotor 145, 150, another bearing may be provided on the opposite side of the rotor 145, 150. In one embodiment, bearing number 168, 169 is also a thrust bearing to control the outward thrust created centrifugal force of the rotor blade.

Each pitch change link 170, 175 is shaped like a crank, with a free end 171, 176, a bend 174, 179, an intermediate segment 172, 177 perpendicular to the free end 171, 176, another 90° bend 173, 178 that leads to a shaft that extends through the bearing 168, 169, through the rotor 145, 150 to the root of the blade 115, 118. The free end 171, 176 of the arm 170, 175 is received in the groove 205, between lower 204 and upper 202 portions of the swash ring 200. As the rotor 145, 150 rotates, the free end 171, 176 of the arm 170, 175 travels in a circular path, with the free end 171, 176 of the arm 170, 175 remaining in the groove 205. Optionally, the free end 171, 176 of the arm 170, 175 may include a low friction coating and/or roller bearing to facilitate sliding motion through the groove 205 of the swash ring 200. Bearings 168, 169 and seals may be provided to facilitate pivoting of the arm 170, 175 relative to the rotor 145, 150, 169 and to prevent intrusion of contaminants.

The swash ring 200 and plurality of linear actuators 210, 215, 220 provide collective and cyclical pitch control for one rotor, while the swash ring 201 and plurality of linear actuators 211, 216, 221 provide collective and cyclical pitch control for the other rotor. The swash rings 200, 201 do not rotate. One end of each linear actuator is attached to the fuselage 105. The opposite end is attached to a side (e.g., the bottom side) of the swash ring. The attachment is preferably a swivel or ball-joint style connection that allows pivoting of the swash ring relative to the connected end of the actuator. A peripheral groove 205 is provided between the top 202 and bottom 204 sections of each swash ring 200. The free end 171, 176 of each pitch change link (i.e., arm 170, 175) travels in the groove 205 of its swash ring 200, 201.

The actuators control the height and orientation of the swash ring relative to a neutral height and horizontally level orientation. The three actuators 210, 215, 220 and 211, 216, 221 per swash ring are spaced radially equidistant (120° apart) along a surface (e.g., the bottom or top side) of the swash ring. Extending an actuator raises or lowers the corresponding section of the swash ring. Extending all actuators for a swash ring raises or lowers all sections of the swash ring collectively. Retracting an actuator lowers or raises the corresponding section of the swash ring. Retracting all actuators for a swash ring lowers or raises all sections of the swash ring. However, the invention is not limited to such an arrangement of actuators. Rather other types, numbers and arrangements of actuators may be used without departing from the scope of the invention.

The swash ring 200, 201 is located between the fuselage 105 and annular rotors 145, 150. The swash ring 200, 201 has a range of motion (designated $h_p$ for pitch height) from a neutral position that does not exceed the stroke of the actuators 210, 215, 220 or twice the length of the upper arm 172. The upper arm 172 is the portion of the arm 170 that extends from the shoulder 173 to the elbow 174. The swash ring 200, 201 may be moved up or down from the neutral position. This range of motion defines the maximum pitch of the blades. The maximum pitch should be set less than the stall angle of attack of the blades at normal operating speed. The swash ring 200, 201 is capable of linear motion along a first axis perpendicular to the swash ring plane, pitch motion about a second axis parallel to the swash ring plane and perpendicular to the first axis, roll motion about a third axis parallel to the swash ring plane and perpendicular to the first axis and perpendicular to the second axis, and combinations of such linear, pitch and roll motions. Such linear, pitch and roll motions affect the free end of each crank arm engaged in the groove, and thereby cause an attendant change in the pitch of each blade. Thus, as the linear actuators 210, 215, 220 raise one section of the swash ring 200, 201, the pitch of each blade as its pitch change link 170 travels through that section of the swash ring 200, 201 will correspondingly increase. If the linear actuators 210, 215, 220 equally raise all sections of the swash ring 200, 201 from the neutral position, the pitch of each blade will correspondingly equally increase.

In one embodiment, a mechanical control linkage system may be assisted by hydraulics and have a force trim system to provide an artificial feel of resistance in the system. The mechanical control linkage mechanically couples flight controls (e.g., joystick, lever and pedals) to the swash ring 200, 201. The hydraulic system provides assisting force and also helps dampen feedback from the control surfaces.

Figure 8:
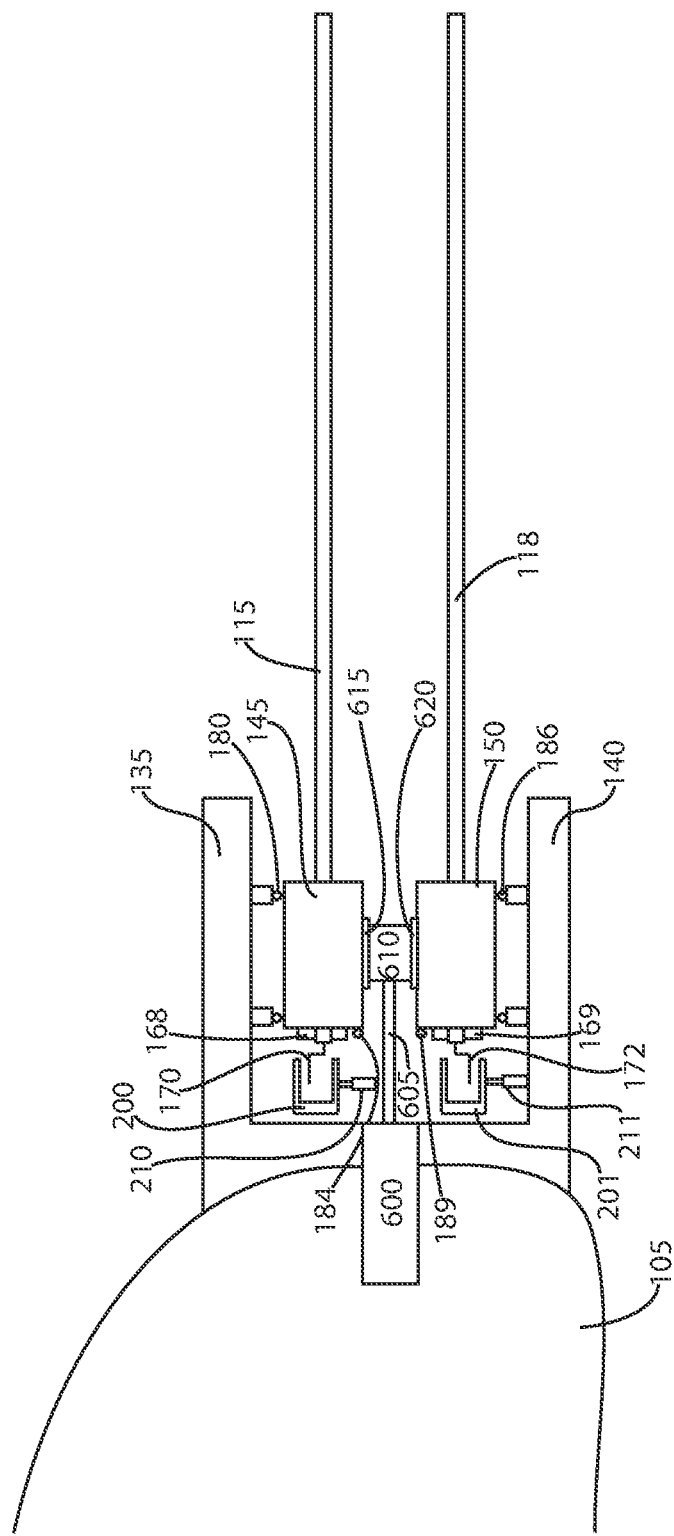
FIG. 8 is a schematic of a portion of an exemplary helicopter with coaxial counter-rotating roller-driven rotors according to principles of the invention.

Referring to FIG. 8 a schematic of a portion of an exemplary helicopter with coaxial counter-rotating roller-driven rotors according to principles of the invention is conceptually illustrated. Blades 115, 118 extends from rotors 145, 150. Rotors 145, 150 rotate in opposite directions. Such opposite rotation can be achieved with the rotating wheel 610. The top surface of the wheel 610 urges the upper rotor 145 in one direction. The bottom surface of the wheel 610 urges the lower rotor 150 in the opposite direction. One rotor undergoes a clockwise rotation while the other rotor undergoes a counterclockwise rotation. Each wheel is driven by a drive shaft 605 operably coupled to an electric motor 600.

To stabilize rotors and reduce friction, a plurality of bearings may be provided. Bearings 180, 182 and 184 are provided for the top, bottom and root surfaces of rotor 145. Bearings 188, 186 and 189 are provided for the top, bottom and root surfaces of rotor 150. Each bearing may comprise one or a plurality of bearings. For example, the top surface bearings 180, 188 may comprise pairs of bearings in contact with the root side of the top surface and the tip side of the top surface of the rotor 145, 150. The bearings may comprise ball bearings or roller bearings.

Each rotor 145, 150 is a ring-shaped structure configured to move (i.e., rotate) relative to the fuselage 105. One rotor is configured for clockwise rotation, while the other rotor is configured for counterclockwise rotation. The diameters of the rotors are equal. Each rotor rotates about a central axis. The central axes are aligned. Thus, the rotors are concentric and coaxial. The rotors are also parallel.

Figure 9:
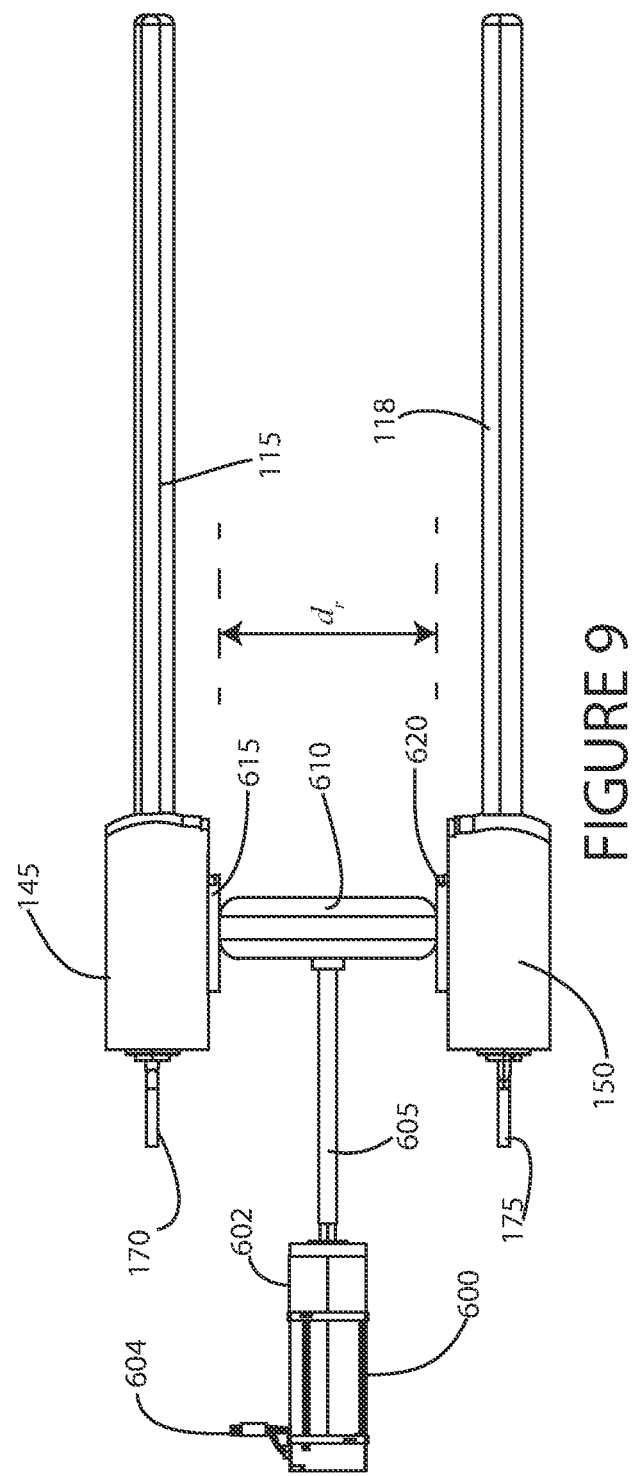
FIG. 9 is a side view of a portion of an exemplary helicopter with coaxial counter-rotating roller-driven rotors according to principles of the invention.
Figure 10:
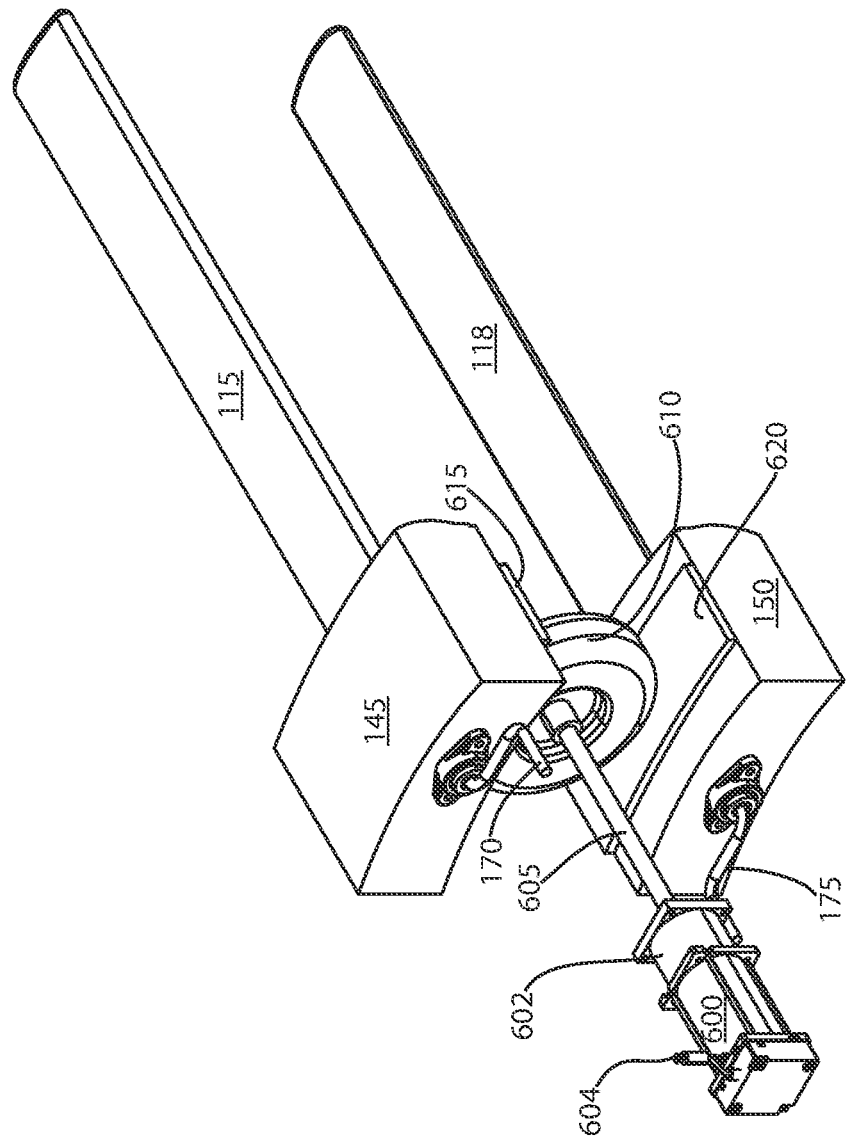
FIG. 10 is a perspective view of the portion of the exemplary helicopter with coaxial counter-rotating roller-driven rotors of FIG. 9.

Referring to FIGS. 9 and 10, the rotors 145, 150 are spaced apart. The distance d r by which the rotors are spaced apart is a distance effective for engagement, i.e., frictional engagement, by a (each) rotating wheel 610 disposed between the rotors. In one embodiment, the distance $d_r$ equals (or about equals) the diameter of the wheel 610. The distance $d_r$ may be slightly less than the diameter of a resilient wheel 610 to ensure good traction (i.e., sufficient traction to impart motion without slipping) between the wheel 610 and each rotor 145, 150.

In one embodiment, each annular rotor may optionally include an annular pad 615, 620. The annular pad 615, 620 may be disposed between each drive wheel 610 and the side of the annular rotor 145, 150 facing the drive wheel 610. Thus, annular pad 615, 620 may be attached to the underside of an upper rotor 145 and another annular pad 620 attached to the topside of a lower rotor 150. The annular pad 615, 620 is secured (e.g., releasably attached) to the side of the annular rotor facing the drive wheel 610. The annular pad 615, 620 provides a high coefficient of friction between the drive wheel 610 and the annular rotor. Mechanical fasteners and/or adhesives may attach the pad 615, 620 to its rotor 145, 150. When worn or damaged, the annular pad 615, 620 may be removed and replaced. In a nonlimiting example, the annular pad may be comprised of the same material as a tire of the wheel 610.

In embodiments with the annular pad 615, 620, the distance $d_r$ may equal (or about equal) the sum of the thickness of each pad 615, 620 and the wheel 610 diameter. With a resilient drive wheel 610, the distance $d_r$ may be slightly less than that sum to ensure good frictional engagement between the wheel 610 and each rotor.

Each motor 600 may be a direct current or alternating current motor, with brushes or brushless. The motor 600 may be an adjustable or a variable speed motor. The motor 600 may be reversible. As the speed of a DC motor is directly proportional to armature voltage and inversely proportional to motor flux (which is a function of field current), either armature voltage or field current can be used to control speed. In an embodiment that uses an AC motor, they motor may be a three-phase induction motor. A variable-frequency drive controller may convert AC line input to AC inverter output to control motor speed and/or torque. Power supply and control lines (i.e., electric wires) may extend from the motor 600 to a controller and power supply in or on the fuselage.

Each motor may optionally drive a gear box 602. The gear box 602 may increase or decrease output rotational speed of the motor output provided to the wheel 610.

The wheel 610 is operably coupled to an output shaft, drive shaft 605. The drive shaft 605 may extend from the motor 600 or from a gear box 602 driven by the motor 600. Each wheel 610 may comprise a tire mounted on a rim, driven by the shaft 605. The tire may be a pneumatic tire or a solid tire. In the case of a pneumatic tire, the tire may be filled with a gas, such as air or nitrogen. A tire filled with nitrogen is preferred as it maintains air pressure longer than regular air-filled tires, maintains a constant tire pressure even at high temperatures, and will not attack (oxidize) bonds in rubber over time. The tire may include a tread that contacts each rotor 145, 150 (or pad 615, 620 attached to the rotor) and a body that mates with a rim. The drive shaft 605 is coupled to the rim. The tread provides traction while the body of the tire provides structure.

A helicopter according to a preferred embodiment has two separate swash rings. The swash rings move similarly, in unison. The swash plates undergo equal collective, pitch and roll movements. Thus, one set of actuators may be coupled to each swash ring, to impart equal movement to the swash rings. A suitable coupling may comprise a pair of connecting links that extend from each actuator. One connecting link couples to one swash ring at a certain clock position. The other connecting link couples to the other swash ring at the same clock position. Each link undergoes the same movement from the actuator. Alternatively, each swash ring may be controlled by a separate set of actuators. In such an embodiment, each illustrated actuator may be viewed as one actuator of an actuator pair.

Figure 11:
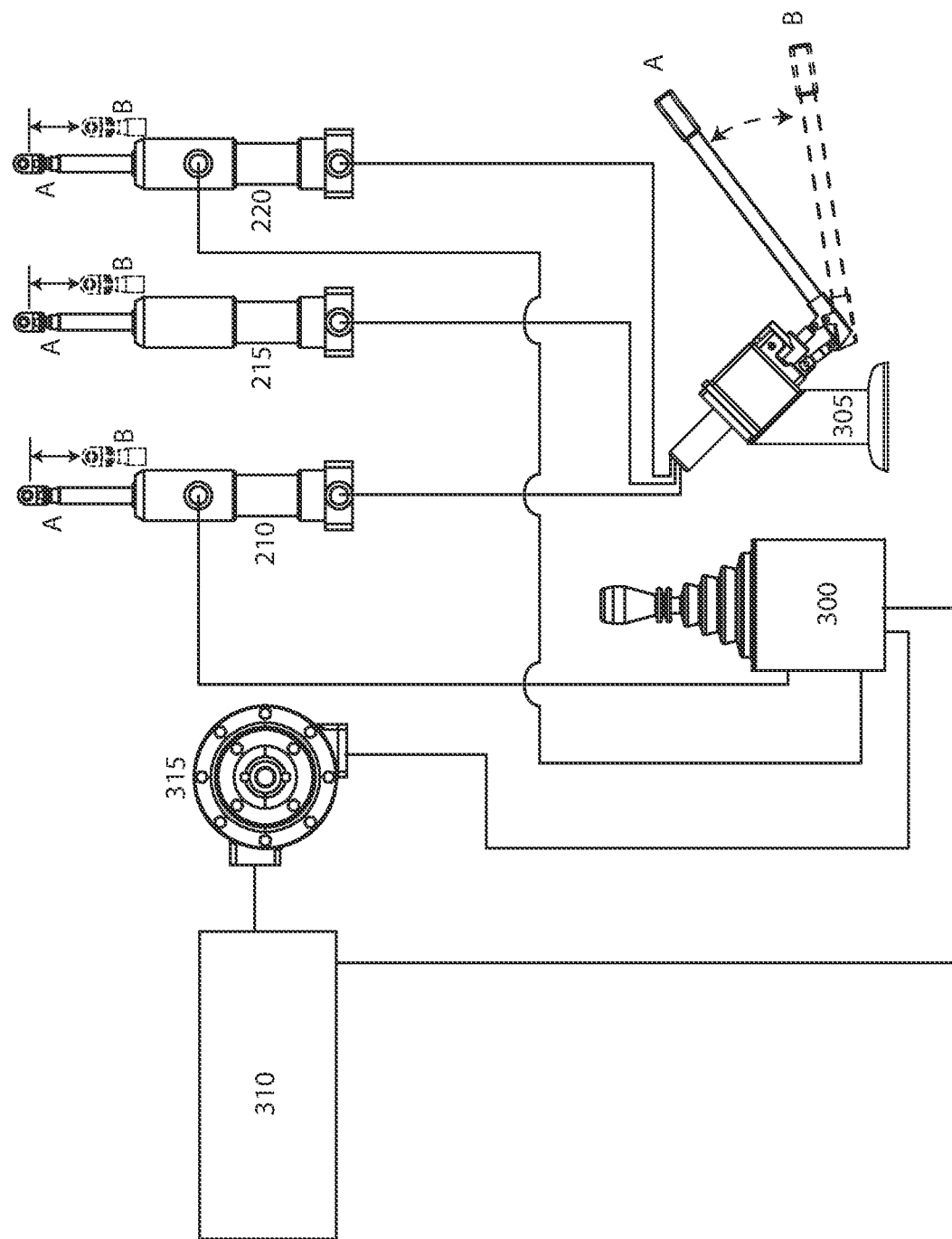
FIG. 11 is a schematic of an exemplary collective and cyclic control system for a helicopter with coaxial counter-rotating roller-driven rotors according to principles of the invention.

Referring now to FIG. 11, exemplary hydraulics for cyclic and collective control include a hydraulic pump 315, a reservoir 310, the plurality of linear actuators 210, 215, 220 for each swash ring 200, 201, and a plurality of user controls, such as a cyclic joystick 300 and collective lever 305, and/or foot pedals. While only three actuators 210, 215, 220 for one swash ring are illustrated, each swash ring includes three actuators. Thus, for purposes of FIG. 11, actuator 210 represents the first aligned actuators of the swash rings 200, 201; actuator 215 represents the second aligned actuator of the swash rings 200, 201; and actuator 220 represents the third aligned actuators of the swash rings 200, 201. The swash rings undergo collective and cyclical pitch control equally and simultaneously.

In another embodiment, three actuators are provided for one swash ring, and mechanical linkages coupled the actuators to the other swash ring, thereby causing equal and simultaneous collective and cyclical pitch control. Thus, movement of an actuator causes equal movement of the swash rings 200, 201 coupled by the linkage. The linkages include pivot or ball joint couplings to accommodate angular movement of the swash ring relative to the lankage.

The reservoir 310 provides a supply of hydraulic fluid for cyclic control. The pump 315 provides a supply of pressurized fluid. The pump may be driven by a belt, gear or drive train operably coupled to one or both of the annular rotors 145, 150, or by a separate motor powered by a battery or fuel from a fuel tank. The controls 300, 305 are hydraulically coupled to the actuators 215, 220, 225 and the pump 315 and reservoir 310. The collective lever 305 actuates a hydraulic cylinder that provides pressurized hydraulic fluid to the actuators 215, 220, 225 equally, and independent of the cyclic control. The joy stick 300 selectively actuates one or more actuators 215, 220, 225 to provide cyclical thrust control. Various hydraulic circuits are feasible, and the invention is not limited to any particular hydraulic circuit.

As lift is proportional to the square of the speed, it is in principle possible to control lift by changing rotor speed. However, the inertia of the rotor inhibits rapid speed changes. Thus, a constant rotor speed is preferred. Rather than change rotor speed to vary lift, the angle of attack of the rotor blades is varied. In principle, a pilot may hold in one hand the collective pitch lever 305. By lifting the lever, the pitch angle of all of the rotor blades is increased by the same amount, and the rotor lift increases immediately. The collective pitch control 305, or collective lever 305, is normally located on the left side of the pilot's seat with an adjustable friction control to prevent inadvertent movement. The collective changes the pitch angle of all the rotor blades collectively (i.e., all at the same time) and independent of their position. Therefore, if a collective input is made, all the blades change equally, and the result is the helicopter increases or decreases its total lift derived from the rotating blades. In level flight this would cause a climb or descent, while with the helicopter pitched forward an increase in total lift may produce an acceleration together with a given amount of ascent.

In order to move around, the pilot pushes the cyclic joystick 300 in the direction of desired travel. This superimposes a cyclic variation of blade pitch on the average or collective setting by tilting the swash rings. The cyclic control 300 changes the pitch angle of the rotor blades cyclically. That is, the pitch or feathering angle of the rotor blades changes depending upon their position as they rotate around the fuselage 105 so that all blades will have the same pitch at the same point in the cycle. The change in cyclic pitch has the effect of changing the angle of attack of a blade and thus the lift generated by a single blade as it moves around the fuselage 105. The result is that lift will increase on one side of the rotor and decrease on the other. In effect, the application of cyclic control 300 tilts the thrust vector. As a result, the helicopter will accelerate in the desired direction.

In another embodiment, the hydraulic system, including hydraulic actuators are replaced with electromechanical actuators and an electronic control system. Electromechanical actuators convert the rotational force of an electric rotary motor into a linear movement to generate the requested linear movement through a mechanism, such as a belt or chain (belt or chain drive axis with stepper or servo) or a screw (either a ball or a lead screw or planetary mechanics). Advantages of electromechanical actuators are their relatively good level of accuracy relative to hydraulics, their possible long life-cycle and little maintenance effort required. Such actuators may generate a relatively high force, on the order of 100 kN (about 22,500 lbs.), more than sufficient force to position each swash ring 200, 201.

In unmanned embodiments, a pilot seat, joystick and collective lever may be omitted and or replaced. In lieu of a joystick and collective lever, electronically controlled valves may be provided. The valves may be coupled to an electronic control unit, containing a microcontroller configured to produce output in response to user or programmed control signals. The microcontroller determines collective and cyclical pitch settings are determined from the control signals. The microcontroller produces output that directly or indirectly (e.g., through a relay) actuates the valves to achieve the determined collective and cyclical pitch settings.

Figure 13:
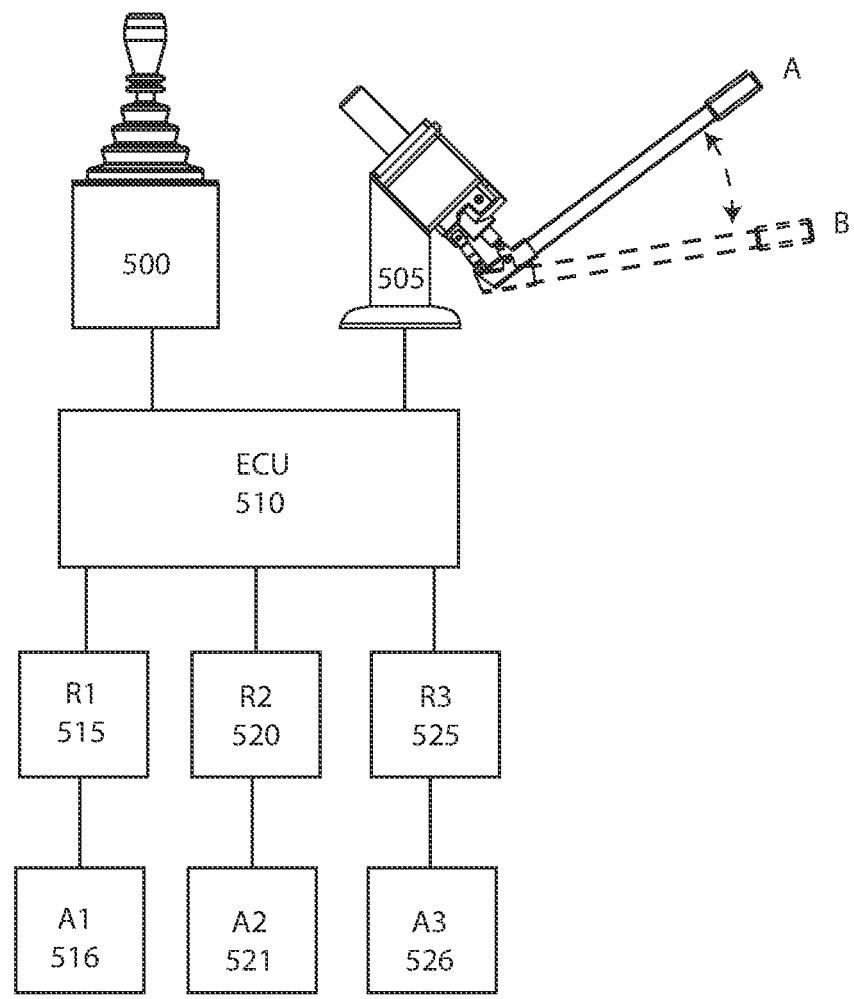
FIG. 13 provides a high-level schematic that conceptually illustrates an electronic control system for an electronically controlled embodiment of a craft according to principles of the invention.

FIG. 13 provides a high-level schematic that conceptually illustrates an electronic control system for an electronically controlled embodiment of a craft according to principles of the invention. An electronic joystick 500 and electronic collective lever 505 are electronically coupled to an electronic control unit (ECU) 510. The ECU 510 is an embedded system that controls one or more of the electrical systems or subsystems in the craft. The subsystems may include a rotor control module, a swash ring control module, and a landing gear control module. The swash ring control module controls actuation of relays 515, 520, 525 operably coupled to electromechanical actuators 516, 521, 526. The actuators 516, 521, 526 provide collective and pitch control to a swash ring. Three relays and actuators are illustrated, which are sufficient for one swash ring. An additional three actuators are provided for the second swash ring. As the actuators are positioned at the same clock positions of each swash ring and provide the same throw, aligned pairs of actuators may be controlled using the same relay. Thus, each actuator 516, 521, 526 may represent a pair of aligned actuators, one actuator in a clock position for the first swash ring 200 and another actuator in the same clock position for the second swash ring 201.

Referring again to FIGS. 2 and 3, the landing gear 130 supports the aircraft on the ground. While wheeled landing gear are shown, skids, skis, floats or a combination of these and other elements can be utilized, depending on the mission. The wheels may be equipped with a shock absorber suspension for dampening shocks and vibrations. As conceptually illustrated the landing gear 130 incorporates oleo-pneumatic struts, telescopic sections containing oil and a compressed gas acting as a spring and damper. Three or more wheels may be used. To decrease drag in flight the landing gear may fully or partially retract into the undercarriage of the fuselage 105 during flight.

Optionally, a cargo parachute may be provided in the center of the canopy to safely lower the entire aircraft in the event of a major problem. In another optional embodiment, the fuselage 105 may be controllably separable from the craft. In yet another optional embodiment, ejection seats with parachutes and a blow away canopy may be provided.

Figure 12:
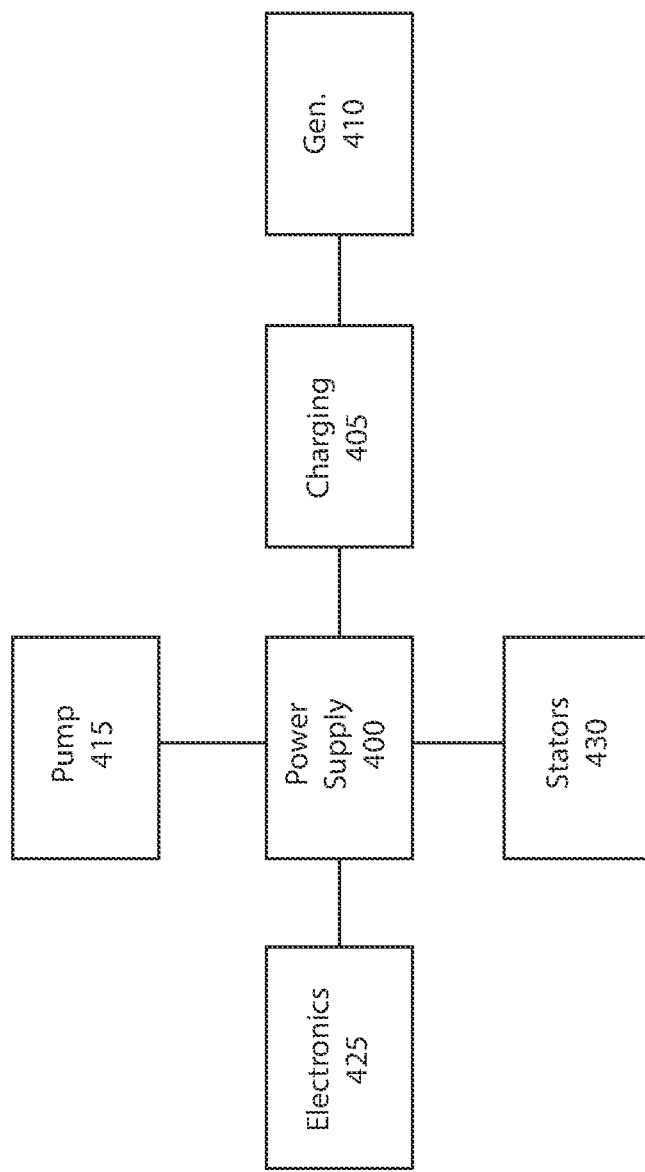
FIG. 12 provides a high-level schematic that conceptually illustrates components of an electrical system for an aircraft according to principles of the invention.

FIG. 12 provides a high-level schematic that conceptually illustrates components of an electrical system for an aircraft according to principles of the invention. An electric power supply 400 is provided. Electric power may be supplied by a bank of rechargeable batteries. The batteries may comprise a bank of rechargeable lithium-ion batteries with no memory effect and good energy density, such as, but not limited to, batteries comprised of lithium cobalt oxide ($LiCoO_2$) cells using a lithium cobalt oxide cathode and a graphite carbon anode, or lithium iron phosphate ($LiFePO_4$) cells using a lithium iron phosphate cathode material and a graphitic carbon with a metallic backing as the anode.

Optionally, a generator 410 and charging circuit 405 are provided to recharge the batteries, without overcharging, and/or to supply power in combination with or in lieu of the power supply 400. The electric generator 410 may comprise an internal combustion engine powering a generator head with electronics that output AC and/or DC power at desired voltages and currents (amps).

In another embodiment, the power supply 400 may comprise a hydrogen fuel cell, such as a proton-exchange-membrane fuel cell, regenerative fuel cell, or solid-oxide fuel cell. In such embodiments, ambient air may be used as an oxidizer for the fuel cell. The fuel may comprise hydrogen or a hydrogen source, such as water from which hydrogen may be obtained through electrolysis, or methanol from which hydrogen may be obtained using a methanol decomposition catalyst.

The power supply 400 is directly, or indirectly through power management circuitry, coupled to various loads, such as a motor 415 for a hydraulic pump 315, onboard electronics 425, and the stators 430 of the annular motors. In embodiments without hydraulic actuators, the actuators may be electromechanical. In such embodiments, the power supply 400 is directly, or indirectly through power management circuitry and relays, coupled to such actuators.

While an embodiment with two counter-rotating rotors is shown. Those skilled in the art will appreciate that embodiments with one main rotor, and further equipped with means to counteract torque from the one main rotor, also come within the scope of the invention. The means may comprise a tail rotor, such as a mast extending from the fuselage, with a rotor and blades, the axis of rotation of the tail rotor being perpendicular to the axis of rotation of the one main rotor, and being oriented to counteract torque from the one main rotor. Alternative means may include one or more thrusters (e.g., rotors with blades) mounted to a peripheral surface of the fuselage and configured to collectively counteract torque of the one main rotor. In each case, the tail rotor and thrusters may comprise an electric motor.

Figure 14:
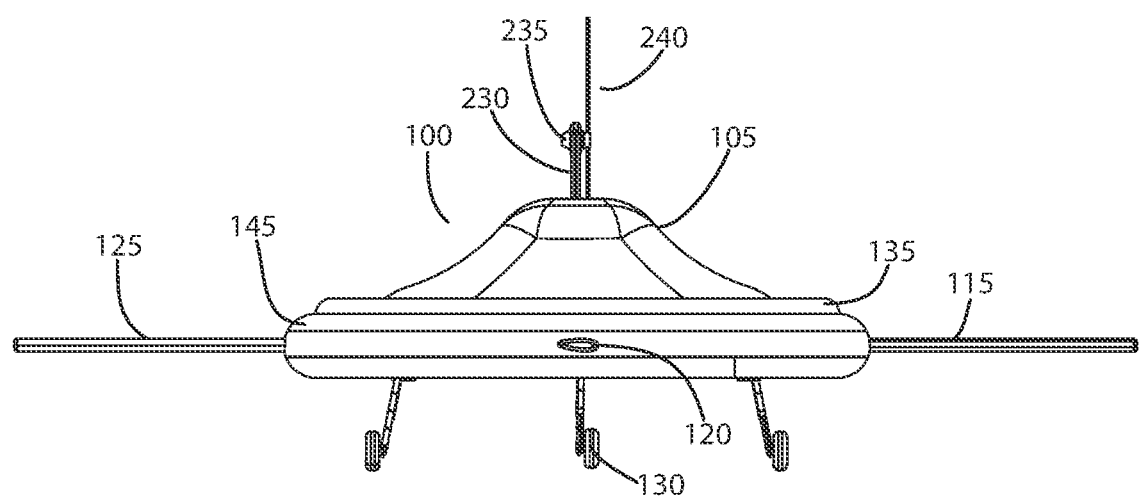
FIG. 14 provides a front view of an exemplary helicopter with a tail rotor according to principles of the invention.
Figure 15:
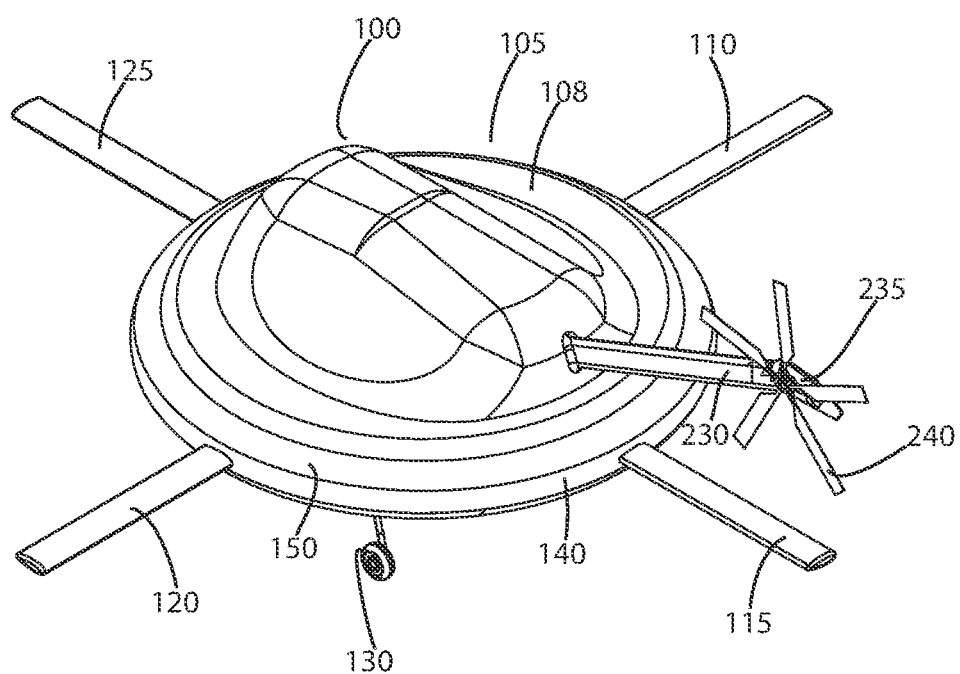
FIG. 15 provides a perspective view of an exemplary helicopter with a tail rotor according to principles of the invention.

FIGS. 14 and 15 conceptually illustrate an exemplary helicopter with a single annular electric motor rotor and a tail rotor according to principles of the invention. The tail rotor includes a tail boom 230 extending from the back of the fuselage 105. The boom 230 is a lever arm that extends from the fuselage 105. An electric motor is housed in a cowl 235. Power supply and control lines (i.e., electric wires) may extend through a hollow passage through the tail boom 230. A tail rotor 240 is attached to a driven shaft or gear train of the electric motor. The axis of rotation of the tail rotor is oriented perpendicular to the axis of rotation of the main rotor 140. Force generated by the tail rotor may not be needed to counteract rotational force (torque) imparted to fuselage by rotation of a rotor 140, because motors 600 that drive wheels 610, rotate about an axis that is perpendicular to the axis of rotation of the rotors 145, 150. Rather, the tail rotor may be operated only to the extent it is necessary to change and maintain direction (orientation) of the fuselage.

Figure 16:
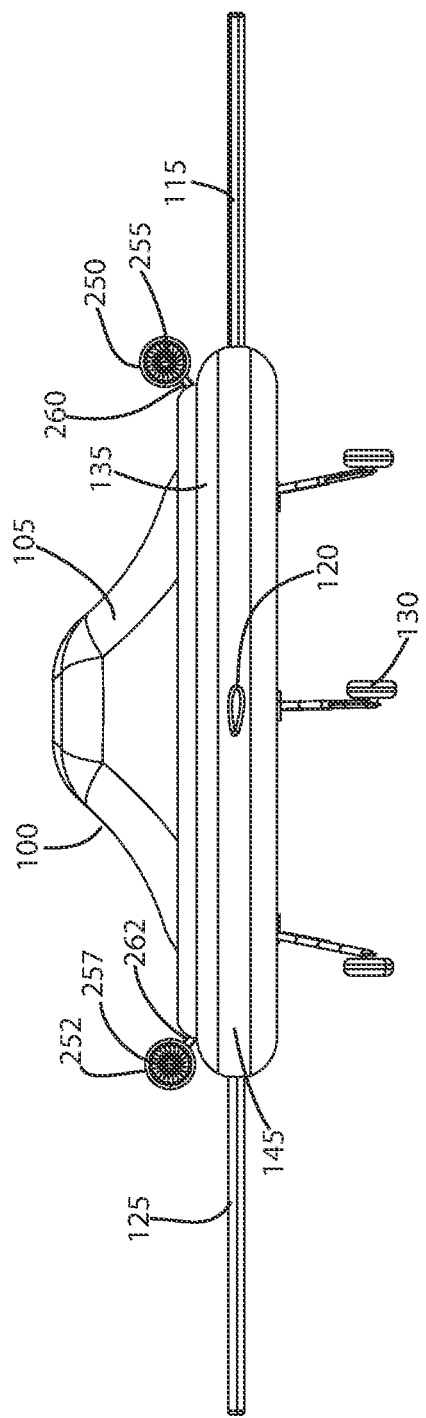
FIG. 16 provides a front view of an exemplary helicopter with side thrusters according to principles of the invention.
Figure 17:
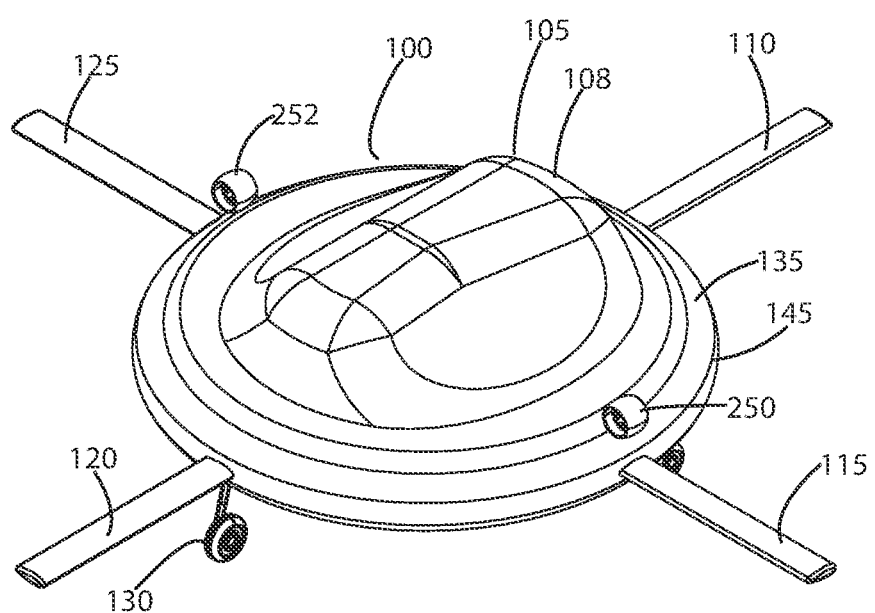
FIG. 17 provides a perspective view of an exemplary helicopter with side thrusters according to principles of the invention.
Figure 18:
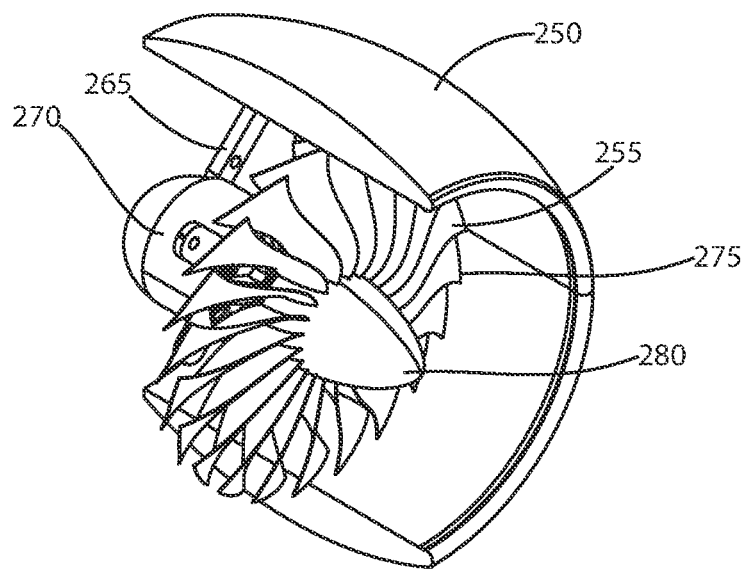
FIG. 18 is a section view of an exemplary side thruster for a helicopter according to principles of the invention.

FIGS. 16 and 17 conceptually an exemplary helicopter roller-driven rotors and a pair of side thrusters, according to principles of the invention. While one side thruster may suffice, two or more may be provided. The side thrusters may be attached to stator 135 of fuselage 105. Each thruster includes a rotor 250, 252, electric motor 255, 257 and support arm 260, 262. The support arm 260, 262 is a lever arm assembly that extends from the fuselage 105. An electric motor 270 is housed in a cowl 255, 257. Power supply and control lines (i.e., electric wires) may extend through a hollow passage in the support arms 260, 262. The thruster is a fan 255 driven by an electric motor within a nacelle 250 attached to the fuselage (e.g., attached to the stator 135) by a support arm 260. The fan 255 uses mechanical energy from the electric motor 270 to force air rearwards. The motor 270 is attached to a motor mount 265. The fan 255 includes a plurality of fan blades 275 extending radially from a hub 280. The fan 255 is attached to a driven shaft or gear train of the electric motor 270 (FIG. 18). The axis of rotation of the fan 255 is oriented perpendicular to the axis of rotation of the rotors 145, 150. Force generated by the fan 255 imparts a torque to fuselage. Such torque may be used to orient the fuselage and to stabilize by counteracting any unwanted rotation of the fuselage.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An electric helicopter comprising:
   a fuselage; and
   a first electric motor, a first drive shaft driven by the first electric motor, a first roller attached to the first drive shaft, the first roller rotating about a first roller axis; and
   a first annular rotor, the first annular rotor including an open center, a first plurality of rotor blades extending radially outwardly from the first annular rotor, each rotor blade of the first plurality of rotor blades being coupled to the first annular rotor with a first pivot coupling, the pitch of each rotor blade of the first plurality of rotor blades being adjustable at the first pivot coupling, at least a portion of the fuselage being disposed in the open center of the first annular rotor, the first annular rotor being rotatable about a first annular rotor axis, the first annular rotor axis being perpendicular to the first roller axis; and
   the first roller abutting and frictionally engaging the first annular rotor, rotation of the first roller causing rotation of the first annular rotor in a first direction of rotation; and
   an electric power supply electrically coupled to the first annular electric motor.

2. The electric helicopter of claim 1, further comprising:
   a second annular rotor, the second annular rotor including an open center, a second plurality of rotor blades extending radially outwardly from the second annular rotor, each rotor blade of the second plurality of rotor blades being coupled to the second annular rotor with a first pivot coupling, the pitch of each rotor blade of the second plurality of rotor blades being adjustable at the first pivot coupling, at least a portion of the fuselage being disposed in the open center of the second annular rotor, the second annular rotor being rotatable about a second annular rotor axis, the second annular rotor axis being perpendicular to the first roller axis, and the second annular rotor axis being aligned with the first annular rotor axis, and the the second annular rotor being concentric with, parallel to and spaced apart from the first annular rotor; and
   the first roller abutting and frictionally engaging the second annular rotor, and rotation of the first roller causing rotation of the second annular rotor and first annular rotor, a direction of rotation of the second annular rotor being opposite the first direction of rotation of the first annular rotor.

3. The electric helicopter of claim 2, a first annular pad attached to the first annular rotor, the first annular pad being disposed between the first roller and the first annular rotor, and a second annular pad attached to the second annular rotor, the second annular pad being disposed between the second roller and the second annular rotor.

4. The electric helicopter of claim 1, further comprising a second electric motor, a second drive shaft driven by the second electric motor, a second roller attached to the second drive shaft, the second roller rotating about a second roller axis; and
   the first annular rotor axis being perpendicular to the second roller axis; and the second roller abutting and frictionally engaging the first annular rotor, rotation of the second roller causing rotation of the first annular rotor; and the electric power supply electrically coupled to the second annular electric motor.

5. The electric helicopter of claim 4, the second roller abutting and frictionally engaging the first annular rotor and the second annular rotor, and rotation of the second roller causing rotation of the second annular rotor and the first annular rotor, the direction of rotation of the second annular rotor being opposite the direction of rotation of the first annular rotor, and the direction of rotation of the second annular rotor caused by the second roller being the same as the direction of rotation of the first annular rotor caused by the first roller.

6. The electric helicopter of claim 1, further comprising a first swash device, the first swash device having a cylindrical outer periphery with a groove extending in a circular path around the cylindrical outer periphery, the cylindrical outer periphery having an outer diameter that is less than an inner diameter of the first annular rotor, and the first swash device being aligned with the first annular rotor, and the first swash device being movable to control collective and cyclical pitch of the rotor blades.

7. The electric helicopter of claim 2, further comprising a first swash device, the first swash device having a cylindrical outer periphery with a groove extending in a circular path around the cylindrical outer periphery, the cylindrical outer periphery of the first swash device having an outer diameter that is less than an inner diameter of the first annular rotor, and the first swash device being aligned with the first annular rotor, and the first swash device being movable to control collective and cyclical pitch of the rotor blades; and a second swash device, the second swash device having a cylindrical outer periphery with a groove extending in a circular path around the cylindrical outer periphery, the cylindrical outer periphery of the second swash device having an outer diameter that is less than an inner diameter of the second annular rotor, and the second swash device being aligned with the second annular rotor, and the second swash device being movable to control collective and cyclical pitch of the rotor blades.

8. The electric helicopter of claim 6, further comprising a plurality of first linear actuators operably coupled to the first swash device to control movement of the first swash device to control collective and cyclical pitch of the first plurality of rotor blades.

9. The electric helicopter of claim 7, further comprising a plurality of first linear actuators operably coupled to the first swash device to control movement of the first swash device to control collective and cyclical pitch of the first plurality of rotor blades; and a linkage coupling the first swash device to the second swash device, wherein movement of the first swash device causes the same movement of the second swash device.

10. The electric helicopter of claim 7, further comprising a plurality of first linear actuators operably coupled to the first swash device to control movement of the first swash device to control collective and cyclical pitch of the first plurality of rotor blades; and a plurality of second linear actuators operably coupled to the second swash device to control movement of the second swash device to control collective and cyclical pitch of the second plurality of rotor blades.

11. The electric helicopter of claim 9, further comprising each linear actuator of the plurality of first linear actuators is aligned with one of the linear actuators of the plurality of second linear actuators to constitute a pair of aligned actuators, and each actuator in a pair of aligned actuators undergoing equal movement.

12. The electric helicopter of claim 10, further comprising a crank arm extending from a root side of each rotor blade of the first plurality of rotor blades extending radially outwardly from the first annular rotor, and from a root side of each rotor blade of the second plurality of rotor blades extending radially outwardly from the second annular rotor, wherein pivoting adjustment of each crank arm causes pitching motion of the rotor blade from which each crank arm extends, each crank arm including a free end engageable for pivoting adjustment of the pitch of each blade.

13. The electric helicopter of claim 12, the free end of each crank arm extending into the groove of one of the first swash device and the second swash device.

14. The electric helicopter of claim 1, the electric power supply comprising at least one battery.

15. The electric helicopter of claim 14, the electric power supply further comprising at least one electric generator.

16. The electric helicopter of claim 1, the electric power supply comprising at least one hydrogen fuel cell.

17. The helicopter of claim 8, each linear actuator comprising one of a hydraulic actuator and an electromechanical actuator.

18. The helicopter of claim 9, each linear actuator comprising one of a hydraulic actuator and an electromechanical actuator.

19. The helicopter of claim 2, a rate of rotation of the second annular rotor being equal in magnitude and opposite in direction to a rate of rotation of the first annular rotor.

20. The helicopter of claim 2, the first roller and the second roller each comprising an inflated tire.

* * * * *